June 26, 1956  H. E. SLOAN ET AL  2,751,824
CLAMPING DEVICE
Filed April 17, 1953
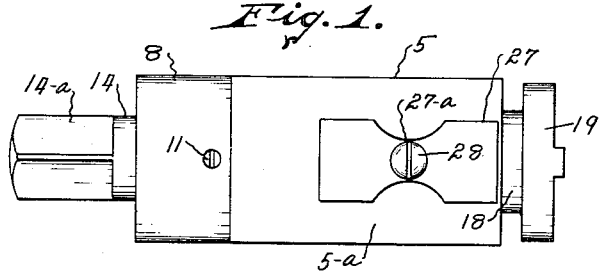
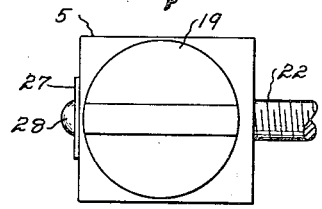
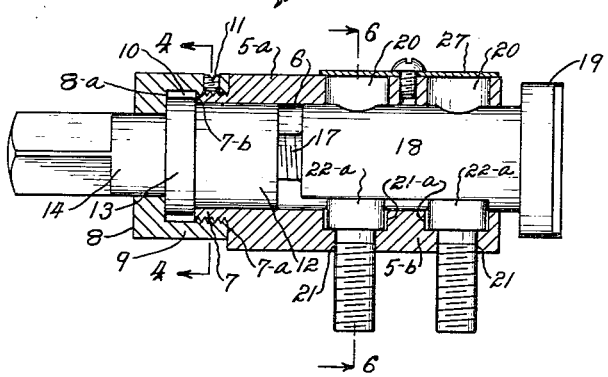
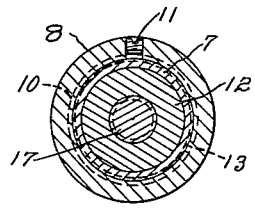
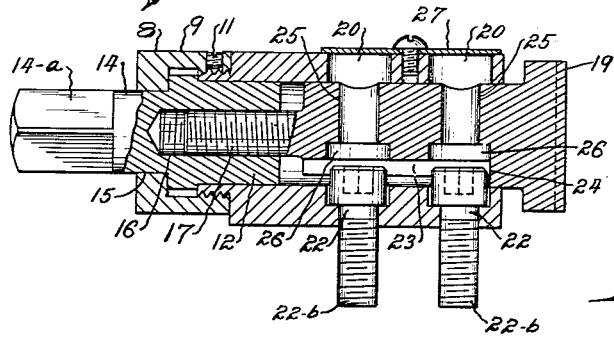
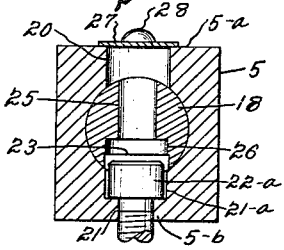
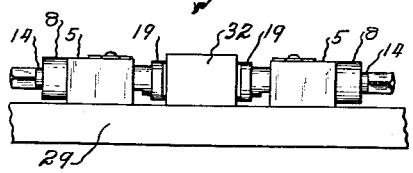
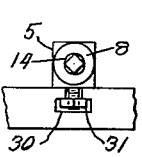
INVENTOR.
HARRY E. SLOAN
BY HERBERT W. HICKEY
Louis V. Lucia
ATTORNEY

United States Patent Office 2,751,824
Patented June 26, 1956

2,751,824

CLAMPING DEVICE

Harry E. Sloan and Herbert W. Hickey, Hartford, Conn., assignors to The Cushman Chuck Company, Hartford, Conn.

Application April 17, 1953, Serial No. 349,394

2 Claims. (Cl. 90—61)

This invention relates to a clamping device and is embodied in a portable clamping jaw which is particularly useful for holding work pieces in position for a machining operation.

The dogs or clamping devices commonly used to hold work pieces on the tables of machine tools or the like for a machining operation usually consist of a number of separate elements and are, therefore, difficult to mount on the work table and in engagement with the work piece. In addition, when using such dogs or clamping devices, it is usually necessary to strike the work piece with a hammer in order to accurately position it with relation to the tool.

An object of this invention, therefore, is to provide a clamping device which may be easily attached to the work table of a machine tool or the like for holding a work piece securely thereon.

Another object of this invention is to provide a clamping device having a clamping jaw which is easily adjustable to thereby permit accurate location of the work piece relatively to the tool.

A further object of this invention is to provide a clamping device in which the fastening means for securing it to the work table of a machine or the like are accessible from the top of the device and thereby greatly facilitating the attachment of said clamping device to the work table.

A still further object of this invention is the provision of such a clamping device which is durable in construction and inexpensive to produce.

Further objects and advantages of this invention will be more clearly understood from the following description and the accompanying drawings in which:

Fig. 1 is a plan view of our improved clamping device.

Fig. 2 is an end view thereof.

Fig. 3 is a side view of said clamping device, partially in central vertical section, illustrating its construction.

Fig. 4 is a sectional end view thereof taken on line 4—4 of Fig. 3.

Fig. 5 is a side view of the clamping device, partially in central vertical section further illustrating its construction.

Fig. 6 is a sectional end view thereof taken on line 6—6 of Fig. 3.

Fig. 7 is a view illustrating the manner in which a pair of our improved clamping devices are used to hold a work piece in position on a work table of a machine.

Fig. 8 is an end view of said clamping device illustrating one manner in which it may be secured to said work table.

Fig. 9 is a fragmentary plan view of a modified form of clamping jaw that is adapted for use in a clamping device embodying our present invention.

Fig. 10 is a sectional view thereof on line 10—10 of Fig. 9.

Referring to the drawing, the numeral 5 denotes the body portion of our clamping device which is substantially square in cross-section and has a cylindrical opening 6 extending longitudinally therethrough providing said body with a top wall 5–a and a bottom wall 5–b; one end of said body portion having an annular threaded extension 7 forming a shoulder 7–a thereon.

A retaining cap 8, having an internally threaded annular skirt 9, is threaded onto the extension 7 and it will be noted that the shoulder 7–a on the body 5 provides a stop which is engaged by the end of said skirt and thereby properly spaces the inner surface 8–a of the top of said cap from the end 7–b of the extension 7 to provide an annular space 10 therebetween. Said retaining cap 8 is prevented from rotating on the extension 7 by a set screw 11 which extends through the wall of the skirt and into engagement with the threads on said extension.

A cylindrical nut 12 is rotatably positioned in the end of the opening 6 and is provided with an annular flange 13 which is contained in the space 10 between the extension 7 and the retaining cap 8 and prevents axial movement of said nut. A shank 14 is integrally formed on said nut and extends therefrom through an opening 15 in the retaining cap 8 and is provided at its outer end with a squared portion 14–a for the reception of a suitable wrench.

The nut 12 is provided with a threaded hole 16 which extends thereinto co-axially of the opening 6 and receives a threaded stem 17 extending axially from the inner end of a cylindrical bar 18 that is slidably mounted in the opening 6 and is provided, at its outer end, with a clamping foot 19.

The top wall 5–a of the body member 5 contains spaced holes 20—20 which extend therethrough and the bottom wall 5–b of said member is provided with similarly spaced holes 21—21 each of which is co-axial with its respective hole 20. The axis of each pair of holes 20 and 21 extends diametrically across the opening 6 and each of the holes 21—21 is counterbored, as at 21–a, to provide a recess which receives the head portion 22–a of a conventional cap screw 22 which has a shank 22–b that extends through the hole 21. The heads of said cap screws project into the opening 6 and into a longitudinal slot 23 in the periphery of the bar 18; the outer end of said slot providing a stop shoulder 24 which engages the head of the adjacent cap screw 22 to limit the inward movement of the said bar, and its inner end being open to receive the heads 22–a of the cap screws and thereby permit insertion of the bar 18 into the opening 6 through the open end thereof when the said bar is being assembled into the clamping device.

Access is had to the heads of the screws 22—22 through holes 25—25 which extend vertically through the bar 18 and each of which is co-axial with its respective openings 20 and 21 when the bar is in its innermost position as illustrated in Figs. 3 and 5. The bottom portion of each of the holes 25 is counterbored, as at 26, to permit vertical movement of the cap screws 22—22 as will be hereinafter more fully described.

A cover member 27 is secured over the holes 20—20 by means of a screw 28 to prevent the entry of foreign matter into the interior of the device. Said cover is provided with a portion of reduced width 27–a adjacent the screw 28 so that it is only necessary to turn said cover 90 degrees from its position shown in Fig. 1 to completely uncover the holes 20—20.

Our improved clamping device is easily assembled by first inserting one of the cap screws 22 through each of the holes 20—20 and through the co-axial holes 21—21 to thereby position the head of said screw in the counterbored portion 21–a of its respective opening 21. The nut 12 is then inserted into the opening 6 and the retaining cap is placed over the shank 14 and threaded onto the extension 7 to thereby securely retain the nut 12 against axial movement relatively to the body member.

The bar 18 is then inserted into the opposite end of the opening 6 with the slot 23 therein in alignment with the heads of the cap screws 22—22. The threaded stem 17 extending from said bar is brought into engagement with the nut 12 and as said nut is rotated the bar 18 will move into the opening 6 until the shoulder 24 at the end of the slot 23 engages the head of the outer cap screw 22.

It will be noted that rotation of the bar 18 in the opening 6 is prevented by engagement of the sides of the slot 23 with the heads of the cap screws 22—22 which project into said slot.

Our clamping device may be fastened to a work table 29 having a conventional T-slot 30 therein by merely inserting a pair of suitable nuts 31 into said T-slot. The clamping device is then placed on the surface of said table with each of the screws 22—22 over one of the nuts 31. The cover 27 is pivoted about the screw 28 to expose the holes 20—20 and a suitable wrench is inserted into the socket in the head of the cap screws through the holes 20 and 25. The screws are rotated by said wrench to draw the nut 31 against the upper portion of the T-slot and securely clamp the body portion 5 to the surface of a table.

The counterbored portion 26 in each of the holes 25—25 permits vertical movement of the cap screw thereunder as the other of said screws is being tightened to thereby prevent binding of the screw against the top of the slot 23 such as might occur if the body portion moved downwardly relatively to the screw 22 which had not yet been tightened into its nut or threaded hole.

Fig. 7 illustrates the use of a pair of our improved clamping devices for securing a work piece 32 in position. The clamping foot 19 of each of the clamping devices is brought into contact with the work piece by applying a suitable wrench to the squared end 14–a of the shank 14 and rotating the nut 12 to move the bar 18 outwardly in the bore 6. It will be understood that the work piece 32 may be very accurately positioned relatively to the tool by moving the clamping foot 19 on each of the devices in the same direction.

If desired, our clamping device may be provided with a modified form of clamping foot such as illustrated in Figs. 9 and 10. The bar 18–a is provided with an extension 33, having flat side portions, which is disposed between spaced bosses 34—34 on a clamping foot 35; said foot being pivotally mounted to said extension by means of a pin 36. This form of clamping foot is particularly useful where the clamping device is used on work pieces having irregular surfaces as it permits said clamping foot to align itself with the surface of said work piece.

It will be noted that, due to the open-ended slot 23, the bar 18 may be removed from the clamping device and replaced with a different bar, such as the modified bar 18–a, while the said device is in secured position and thereby eliminates the necessity of disturbing the adjustment on the work table 29.

We claim:
1. A clamping device comprising a body member having a cylindrical opening extending therethrough providing a top wall and a bottom wall; said bottom wall having a hole therethrough communicating with said opening and said top wall having a hole therethrough substantially in alignment with the hole in said bottom wall, a cylindrical bar slidably disposed in said opening and having a longitudinal slot in its periphery extending for a portion of its length and a hole extending therethrough and communicating with said slot, a fastening member extending through the hole in the bottom wall and having a head portion disposed in said opening and extending into said slot; the outer end of said slot providing a stop which is engageable with said head portion to limit inward movement of said bar to a position wherein the hole therein will be in alignment with said fastening member and with the hole in the top wall whereby access to said fastening member is provided, a clamping portion on said bar, and rotatable means for moving said bar in said opening; the said slot being open at its outer end to receive the head portion of the fastening member as the bar is being inserted into the cylindrical opening.

2. A clamping device comprising a body member having an open-ended cylindrical opening providing a bottom wall, fastening members extending through openings in said bottom wall for securing the clamping device in adjusted positions, the said fastening members having head portions projected into the said cylindrical opening, a cylindrical bar slidable into the cylindrical opening and insertable thereinto through the open end thereof, the said cylindrical bar having a slot in the bottom thereof for containing the said head portions of the fastening members, and the forward end of said slot being open to receive the said head portions of the fastening members as the said bar is being inserted into the cylindrical opening.

References Cited in the file of this patent

UNITED STATES PATENTS

| Number | Name | Date |
|---|---|---|
| 150,980 | Sherwood | May 19, 1874 |
| 1,027,341 | Jurkovich | May 21, 1912 |
| 1,512,939 | Ledin | Oct. 28, 1924 |
| 1,919,812 | Swanson | July 25, 1933 |
| 2,435,971 | Ludel | Feb. 17, 1948 |
| 2,621,686 | Tompkins | Dec. 16, 1952 |
| 2,624,222 | Joy | Jan. 6, 1953 |